Oct. 26, 1926.
H. VAN DER HOF
1,604,137
STEERING DEVICE FOR VEHICLE TRAINS
Filed Jan. 22, 1925
Fig: 1.
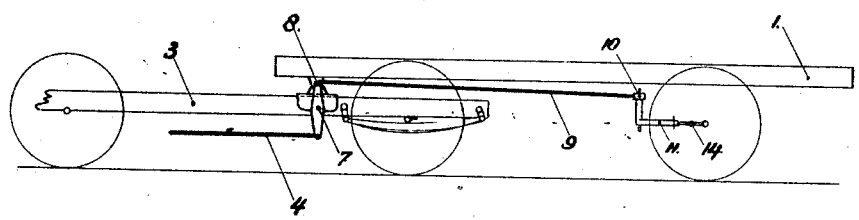
Fig: 2
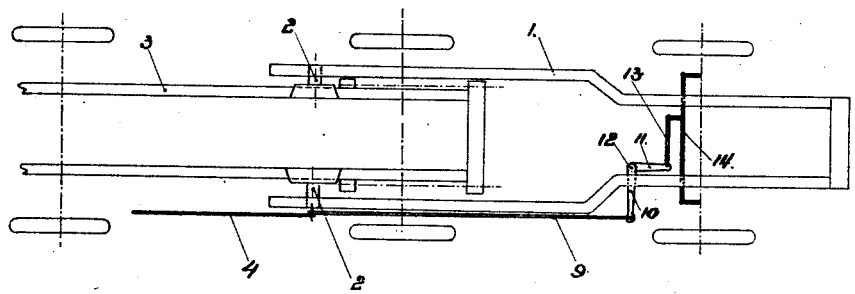
Fig: 3.
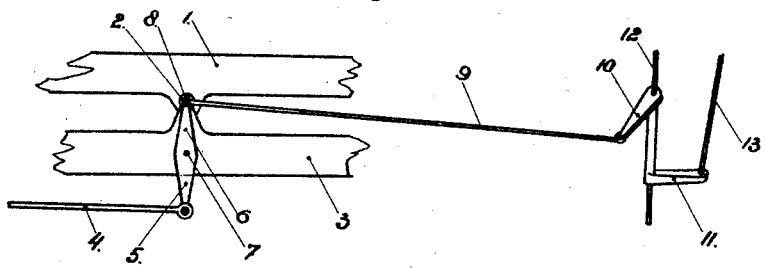
INVENTOR:
Hermanus Van Der Hof
By Richards & Geier
Attys.

Patented Oct. 26, 1926.

1,604,137

UNITED STATES PATENT OFFICE.

HERMANUS VAN DER HOF, OF AMSTERDAM, NETHERLANDS, ASSIGNOR TO NAAM-LOOZE VENNOOTSCHAP INTERNATIONALE TRUCK & TRAILER COMPAGNIE, OF AMSTERDAM, NETHERLANDS.

STEERING DEVICE FOR VEHICLE TRAINS.

Application filed January 22, 1925, Serial No. 3,922, and in Netherlands November 14, 1924.

This invention relates to an improved steering mechanism for automobiles having three axles, or an automobile having two axles and one or more trailers, or automobiles with three axles and one or more trailers, wherein the vehicle consists of chassis elements pivotally connected to each other and to the automobile, and wherein each trailer need not have its front part on the rear of the frame of another trailer, and has for its main object to provide steering mechanism that is simple in construction, effective in operation, and durable in use and adapted to correctly steer the chassis elements forward and backward, and avoid any displacement of the members of the steering mechanism which might effect a steering of the wheels, so that a displacement of the trailer with respect to the automobile will have no influence on the position of the wheels of the trailer.

The invention consists in providing the steering mechanism with one or more pivots or hinges disposed in the common axis or axes of rotation of the chassis elements which are not rigidly interconnected, or which pivots constructively are disposed as near as possible to said axis or axes of rotation. With this construction the advantage is obtained that the steering mechanism is not materially influenced by the relative swinging movement of the chassis elements. This relative movement of the chassis elements therefore does not interfere with the steering mechanism, since the latter also pivots about the same axis as the chassis elements.

The annexed drawing illustrates by way of example one form of device made in accordance with our present invention.

Figure 1 shows a diagrammatical side elevation of the hind part of an automobile with more than two axles.

Figure 2 is a plan view of Figure 1 and Figure 3 is a perspective view of the steering mechanism according to the invention.

The chassis 1 of the trailer is pivotable about the axle 2 with respect to the chassis 3 of the automobile so that the trailer will pivot or swing about this axle when the vehicle is travelling over an uneven road or runs over an elevation or depression in the road. When steering the front wheels of the automobile the movement of the wheels is transferred by a bar 4 to a double armed lever 5, 6 the pivot of which is rigidly secured to the chassis 3 of the automobile. The upwardly projecting arm 6 of the lever 5, 6 by means of a pivot 8 is connected to a rod 9, which by means of a double-armed lever 10, 11 rotatably mounted on the axis 12 is pivotally connected to a rod 13 which transmits this movement to the controlling rod 14 by which the wheels of the trailer are displaced. The particular characteristic of this steering mechanism consists in that one of the pivots of the steering mechanism is situated in the same axis as that about which the trailer swings with respect to the automobile, and the members of the steering mechanism adjacent said pivot move in a plane extending at right angles to the plane of the common pivot or pivots of the chassis elements. In the embodiment shown the pivot 8 of the steering mechanism is situated in the line of the axle 2 about which the trailer swings.

What I claim is:

1. In a vehicle train having a plurality of chassis elements and pivotal connections between said elements, steering mechanism provided with a pivot having its axis extending in the line of the axis of said pivotal connections between said elements, and having the members of said steering mechanism adjacent said pivot movable in a plane extending at right angles to the axis of the common pivots of the chassis elements.

2. In a vehicle train having an automobile and a trailer connected with the chassis of said automobile by horizontally extending pivotal connections, steering mechanism provided with a pivot having its axis extending in the line of the axis of said pivotal connections between said automobile chassis and trailer, and having the members of said steering mechanism adjacent said pivot movable in a plane extending at right angles to the axis of the pivotal connections between said automobile chassis and said trailer.

3. In a vehicle train, a plurality of chassis elements having pivotal connections therebetween, and a steering mechanism including a lever and a rod pivotally connected together, the pivot of said lever and rod extending in longitudinal alignment with the axis of said pivotal connections, and said lever being movable in a plane extending at right angles to said axis.

In testimony whereof I have affixed my signature.

HERMANUS VAN DER HOF.